(12) United States Patent
Minaguchi et al.

(10) Patent No.: US 7,957,127 B2
(45) Date of Patent: Jun. 7, 2011

(54) ELECTRONIC APPARATUS HAVING BATTERY RECEPTACLE AT THE REAR OF KEYBOARD

(75) Inventors: Hiroyuki Minaguchi, Higashimatsuyama (JP); Hidemi Itakura, Nishitama-gun (JP); Takayuki Arisaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 172 days.

(21) Appl. No.: 12/269,706

(22) Filed: Nov. 12, 2008

(65) Prior Publication Data

US 2009/0059488 A1 Mar. 5, 2009

Related U.S. Application Data

(63) Continuation of application No. 10/839,610, filed on May 4, 2004, now Pat. No. 7,542,274.

(30) Foreign Application Priority Data

Nov. 26, 2003 (JP) .................................. 2003-396021

(51) Int. Cl.
*G06F 1/16* (2006.01)
(52) U.S. Cl. ................. 361/679.17; 361/679.27; 429/96
(58) Field of Classification Search .............. 361/679.17
See application file for complete search history.

(56) References Cited

U.S. PATENT DOCUMENTS

| | | | |
|---|---|---|---|
| 5,132,876 A | 7/1992 | Ma | |
| 5,243,549 A * | 9/1993 | Oshiba | 361/679.09 |
| 5,400,055 A | 3/1995 | Ma et al. | |
| 5,422,784 A | 6/1995 | Wakahara et al. | |
| 5,483,418 A | 1/1996 | Hosoi | |
| 5,510,953 A * | 4/1996 | Merkel | 361/679.08 |
| 5,526,226 A | 6/1996 | Katoh et al. | |
| 5,627,728 A | 5/1997 | Ma | |
| 6,064,564 A | 5/2000 | Song et al. | |
| 6,078,496 A | 6/2000 | Oguchi et al. | |
| 6,159,632 A | 12/2000 | Osawa | |
| 6,191,941 B1 | 2/2001 | Ito et al. | |
| 6,212,066 B1 | 4/2001 | Fetterman | |
| 6,213,578 B1 * | 4/2001 | LaGrotta et al. | 312/351 |
| 6,307,736 B1 | 10/2001 | Song et al. | |
| 6,493,215 B1 * | 12/2002 | Chiang et al. | 361/679.08 |

(Continued)

FOREIGN PATENT DOCUMENTS

CN 2444266 8/2001

(Continued)

OTHER PUBLICATIONS

European Search report Application No. 04009712.3-1232 mailed Mar. 15, 2010.

(Continued)

*Primary Examiner* — Jayprakash N Gandhi
*Assistant Examiner* — Anthony Q Edwards
(74) *Attorney, Agent, or Firm* — Blakely, Sokoloff Taylor & Zafman, LLP (57) ABSTRACT

According to one embodiment of the invention, an electronic apparatus comprises a housing including a keyboard mount portion. A keyboard is mounted on the keyboard mount portion. The keyboard has a plurality of fixing pieces. The fixing pieces are protruded at the rear of the keyboard mount portion, and are removably fixed to the housing. A receptacle on which a module is removably mounted is provided in the housing. The receptacle is located between the fixing pieces at the rear of the keyboard mount portion.

13 Claims, 12 Drawing Sheets

U.S. PATENT DOCUMENTS

| | | |
|---|---|---|
| 6,532,152 B1 | 3/2003 | White et al. |
| 6,563,702 B1 | 5/2003 | Shin et al. |
| 6,648,231 B1* | 11/2003 | Chuang .................. 235/472.01 |
| 6,731,269 B2 | 5/2004 | Horiuchi et al. |
| 6,795,305 B2 | 9/2004 | Tanaka et al. |
| 6,842,332 B1 | 1/2005 | Rubenson et al. |
| 7,102,878 B2 | 9/2006 | Yu et al. |
| 7,542,274 B2 | 6/2009 | Minaguchi et al. |
| 2002/0006750 A1 | 1/2002 | Hidesawa |
| 2003/0011986 A1 | 1/2003 | Ariga |
| 2003/0021082 A1 | 1/2003 | Lu et al. |
| 2003/0059242 A1 | 3/2003 | Horiuchi et al. |
| 2005/0110761 A1* | 5/2005 | Minaguchi et al. .......... 345/168 |
| 2006/0165465 A1 | 7/2006 | Wu |
| 2008/0192426 A1* | 8/2008 | Minaguchi et al. ........... 361/686 |
| 2009/0059487 A1* | 3/2009 | Minaguchi et al. ...... 361/679.09 |
| 2009/0059488 A1* | 3/2009 | Minaguchi et al. ...... 361/679.09 |

FOREIGN PATENT DOCUMENTS

| | | |
|---|---|---|
| CN | 2541898 | 3/2002 |
| EP | 1 162 532 | 12/2001 |
| JP | 11-175186 | 7/1999 |
| JP | 2001-102018 | 4/2001 |
| JP | 2002-182784 | 6/2002 |

OTHER PUBLICATIONS

U.S. Appl. No. 12/269,688 Office Action mailed Nov. 30, 2009.
Notification of a First Office Action in a corresponding Chinese application dated Jul. 7, 2006.

* cited by examiner

ELECTRONIC APPARATUS HAVING BATTERY RECEPTACLE AT THE REAR OF KEYBOARD

CROSS-REFERENCE TO RELATED APPLICATIONS

This application is a continuation application of U.S. patent application Ser. No. 10/839,610, filed May 4, 2004, now U.S. Pat. No. 7,542,274, which is based upon and claims the benefit of priority from Japanese Patent Application No. 2003-396021, filed Nov. 26, 2003, the entire IC contents of which are incorporated herein by reference.

BACKGROUND

1. Field

Embodiments of the invention relate to an electronic apparatus having, for example, a computer module such as a battery pack allocated at the rear of a keyboard.

2. Description of the Related Art

For example, Jpn. Pat. Appln. KOKAI Publication No. 11-175186 (reference 1) discloses an electronic apparatus such as a portable computer comprising a keyboard at the top surface of a housing. The keyboard has a keyboard frame and a plurality of keys allocated at the top surface of the keyboard frame. The keyboard frame is removably supported at a keyboard mount portion formed on the top surface of the housing. The keyboard mount portion is formed as a recessed area that opens on the top surface of the housing, and its size corresponds to the keyboard frame.

At the front edge, the keyboard frame removably hangs at the front end portion of the keyboard mount portion. The rear edge of the keyboard frame is held at the rear end part of the keyboard mount portion via a keyboard holder made of a synthetic resin.

The keyboard holder is formed in an elongated rod shape that extends along the rear edge of the keyboard frame. The keyboard holder has a plurality of engagement claws. The engagement claws are removably engaged at the rear end part of the keyboard mount portion. By this engagement, the keyboard holder is held in the housing, and the rear edge of the keyboard frame is sandwiched between the keyboard holder and the keyboard mount portion.

On the other hand, Jpn. Pat. Appln. KOKAI Publication No. 2001-102018 (reference 2) discloses an electronic apparatus such as a portable computer having a battery pack mounted at the rear end part of a housing having a keyboard. The housing of this electronic apparatus comprises a battery receptacle that removably supports the battery pack. The battery receptacle is provided between a pair of hinges which rotatably support a display unit, and is located at the rear of a keyboard mount portion.

In view of these references, if a keyboard holder is employed to fix that keyboard, it must be interposed between the keyboard mount portion and the battery receptacle. As a result, the gap between the keyboard mount portion and the battery receptacle unavoidably increases. An increase in the a dimensional depth of the housing poses an obstacle in the achievement of compactness of the electronic apparatus.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION

Hereinafter, a first exemplary embodiment of the present invention will be described with reference to FIGS. 1 to 13.

Figure 1:
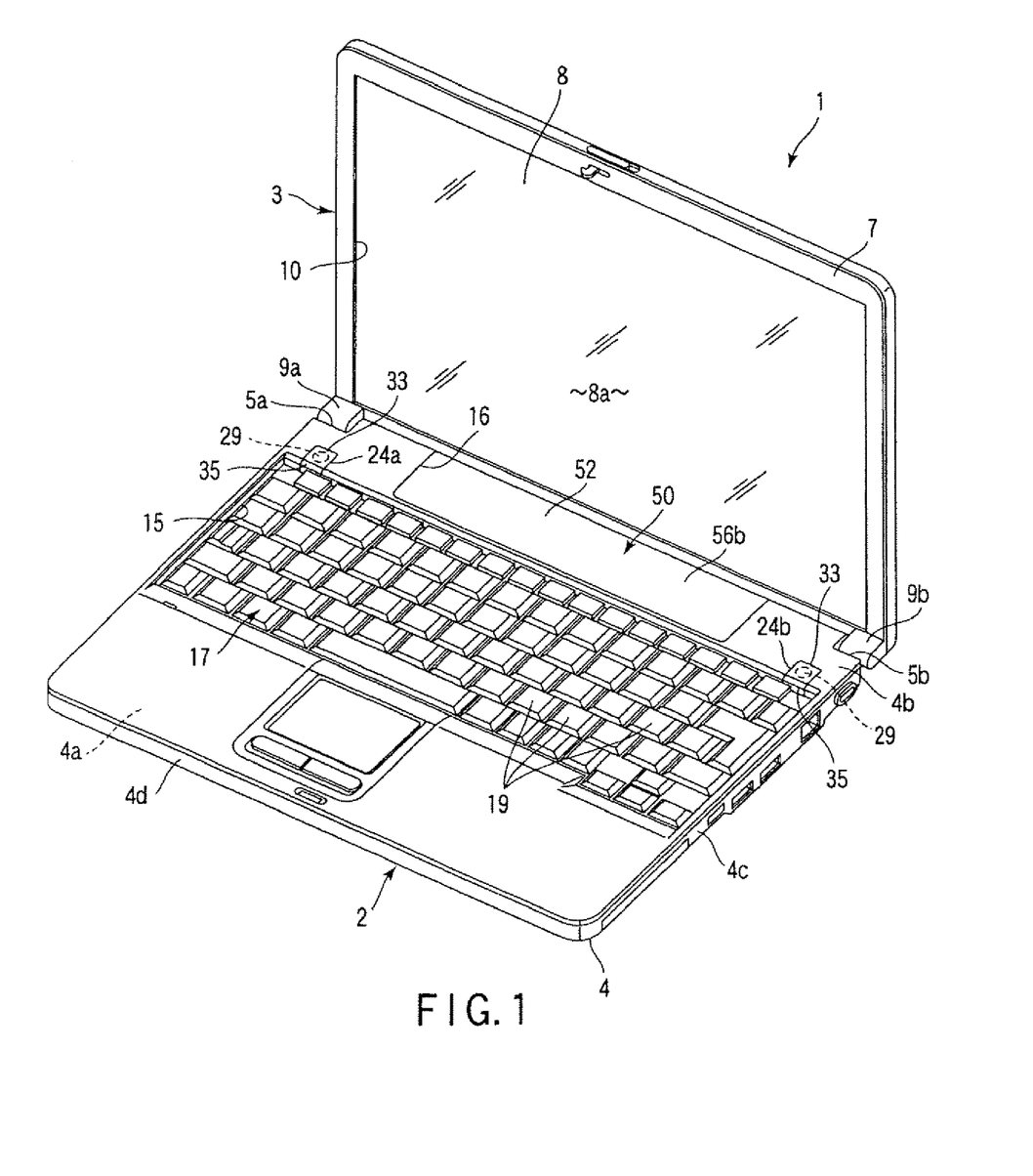
FIG. 1 is an exemplary perspective view of a portable computer according to a first embodiment of the present invention.

FIG. 1 discloses a portable computer 1 as an electronic apparatus. The portable computer 1 comprises a computer main unit 2 and a display unit 3. The computer main unit 2 has a metallic housing 4. The housing 4 is formed in a flat box shape having a bottom wall 4a, a top wall 4b, left and right side walls 4c, a front wall 4d, and a rear wall 4e.

Recess portions 5a and 5b are formed at the corner defined by the side wall 4c and rear wall 4e of the housing 4. The recess portions 5a and 5b are positioned at the rear end of the housing 4, and are spaced from each other in the widthwise direction of the housing 4.

The display unit 3 comprises a display housing 7 and a liquid crystal display panel 8. The display housing 7 is formed in a flat box shape whose size is equal to that of the housing 4, and has a pair of leg portions 9a and 9b at one end part of the display panel 7. The leg portions 9a and 9b are spaced from each other in the widthwise direction of the display housing 7, and enter the recess portions 5a and 5b of the housing 4.

The liquid crystal display panel 8 is housed in the display housing 7. The liquid crystal display panel 8 has a screen 8a that displays an image. The screen 8a is exposed outwardly of the display housing 7 through an opening 10 formed at the front surface of the display housing 7.

Figure 3:
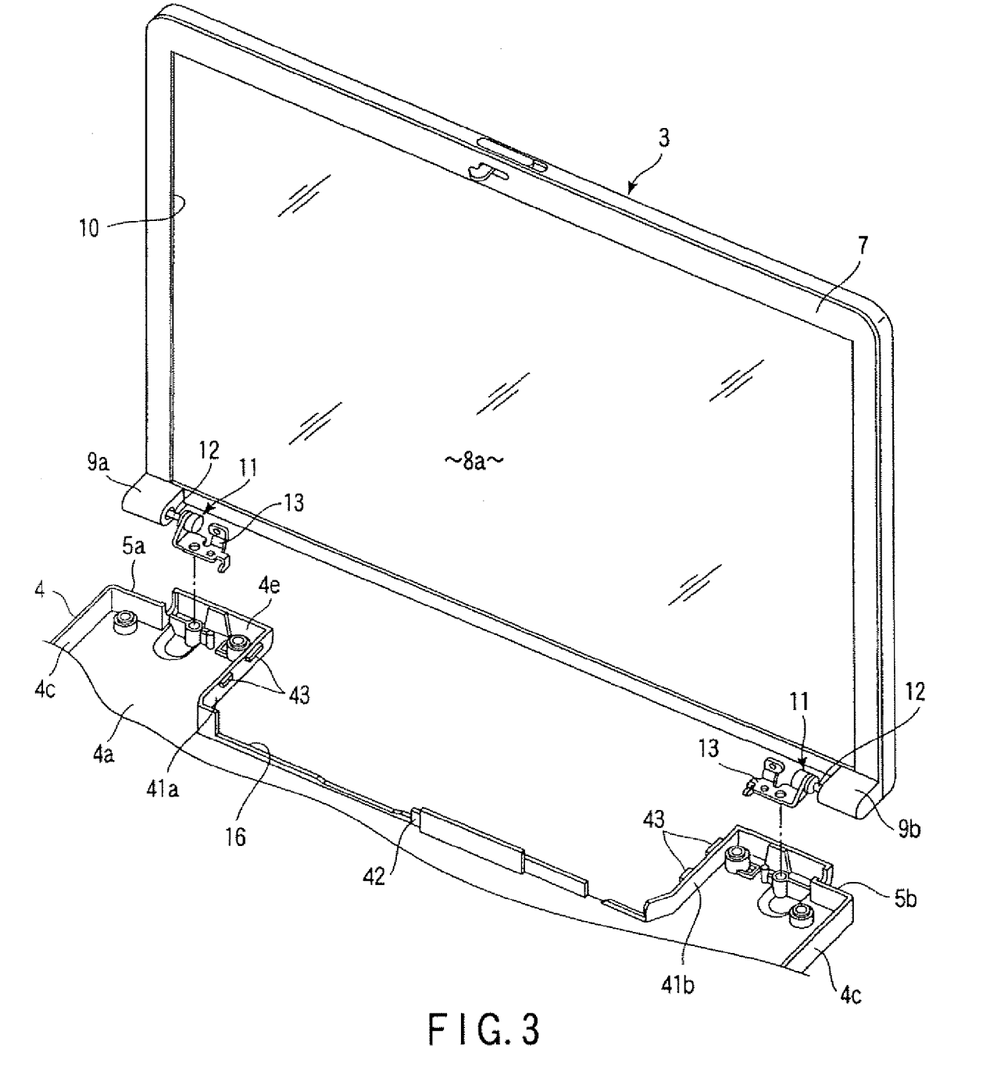
FIG. 3 is an exemplary perspective view of the portable computer showing a positional relationship between a battery receptacle of a housing and a hinge bracket for rotatably supporting a display unit according to the first embodiment of the invention

As shown in FIG. 3, the display unit 3 is supported in the housing 4 via a pair of hinges 11. The hinges 11 each have a hinge shaft 12 overhanging between each leg portions 9a and 9b each and the housing 4. The hinge shaft 12 is horizontally allocated along the widthwise direction of the housing 4. At one end, the hinge shaft 12 is rotatably supported in the housing 4 via a bracket 13. At the other end, the hinge shaft 12 is fixed to the display housing 7 via another bracket (not shown).

The display unit 3 is rotatable between a closed position and an open position around the hinge shaft 12. At the closed position, the display unit 3 lies on the housing 4 so as to cover the computer main unit 2 from above. At the open position, the display unit 3 is erected relevant to the computer main unit 2 so as to expose the top wall 4b of the housing 4.

Figure 4:
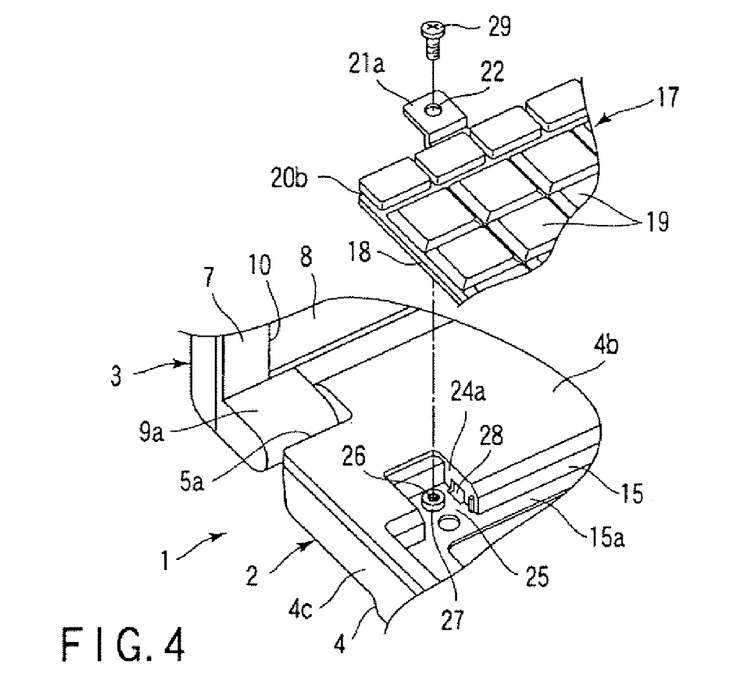
FIG. 4 is an exemplary perspective view showing a positional relationship between a fixing piece at the left side of a keyboard and a receiving portion at the left side of the housing according to the first embodiment of the invention.
Figure 5:
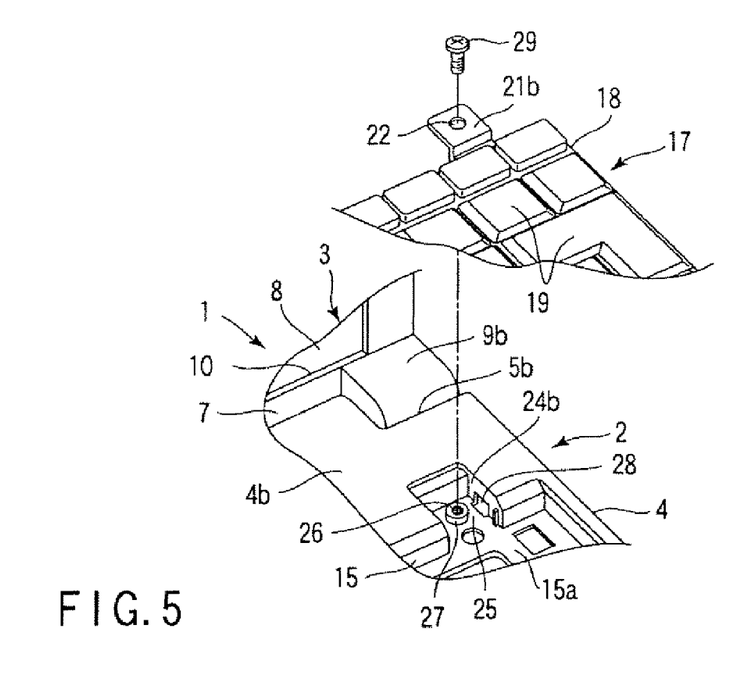
FIG. 5 is an exemplary perspective view showing a positional relationship between a fixing piece at the right side of the keyboard and a receiving portion at the right side of the housing according to the first embodiment of the invention.
Figure 6:
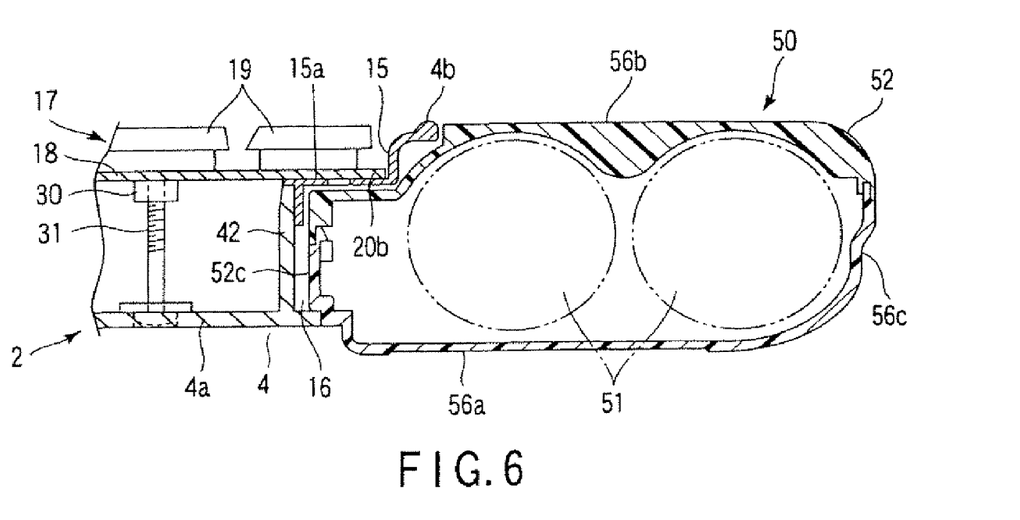
FIG. 6 is a sectional view taken along the line F6-F6 of FIG. 2.
Figure 7:
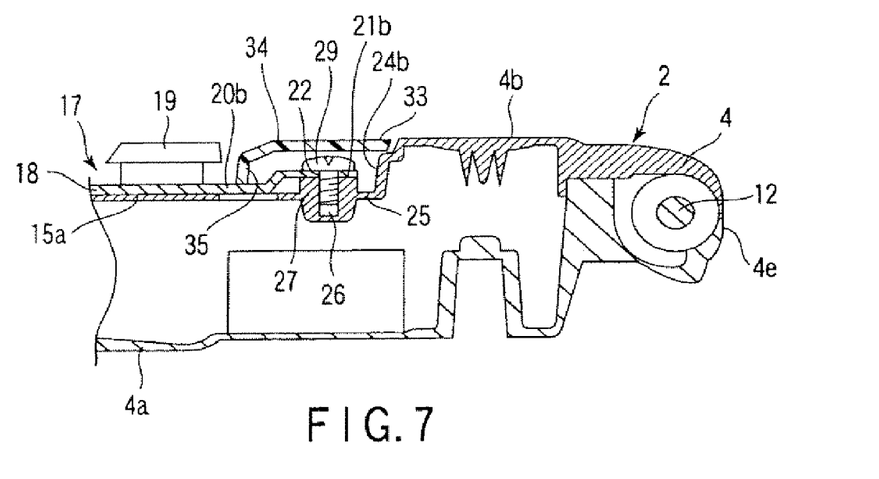
FIG. 7 is a sectional view taken along the line F7-F7 of FIG. 2.
Figure 8:
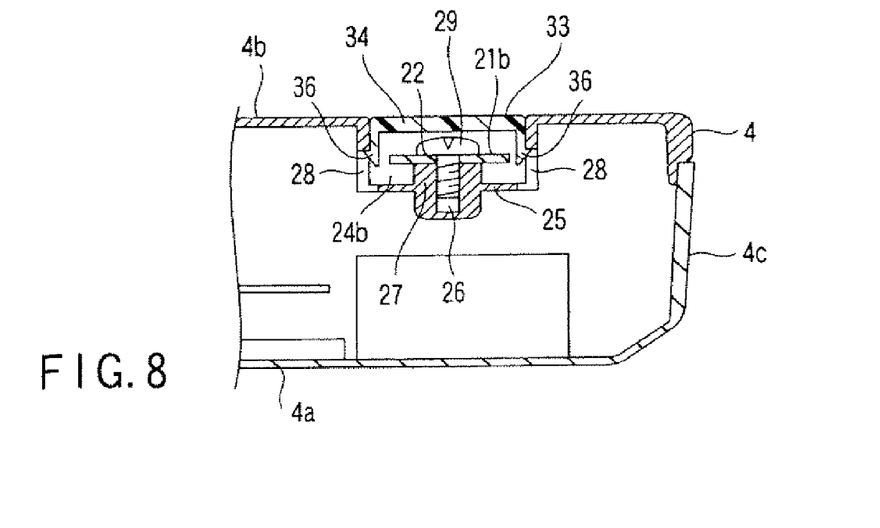
FIG. 8 is a sectional view taken along the line F8-F8 of FIG. 2.
Figure 9:
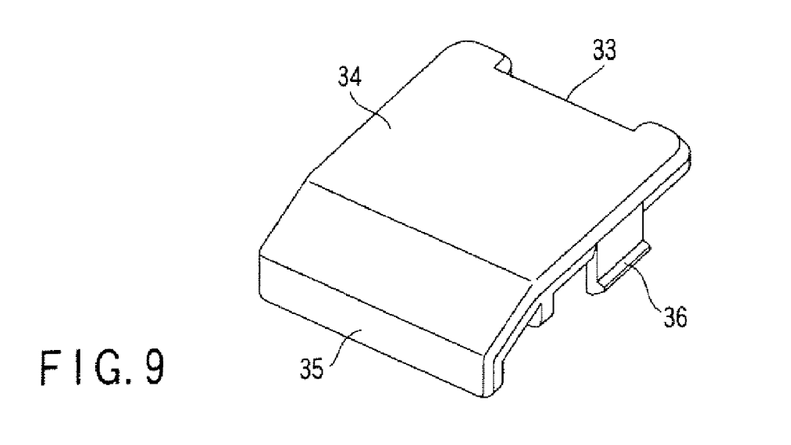
FIG. 9 is an exemplary perspective view of a cover for covering the receiving portion of the housing according to the first embodiment of the invention.
Figure 10:
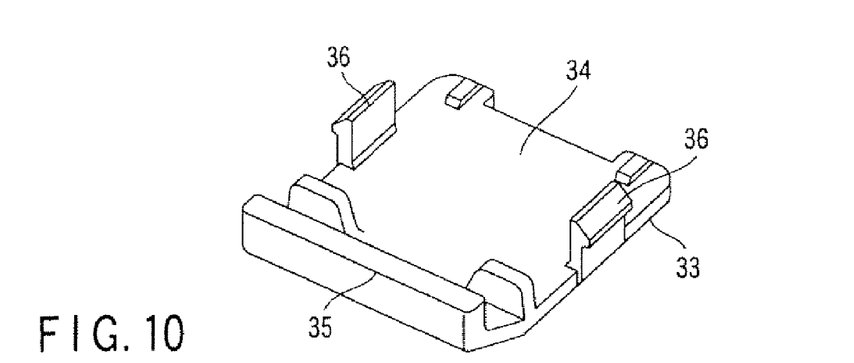
FIG. 10 is an exemplary perspective view when the cover for covering the receiving portion of the housing is seen from the bottom side according to the first embodiment of the invention.

As shown in FIG. 1, the housing 4 comprises a keyboard mount portion 15 and a battery receptacle 16. The keyboard mount portion 15 is formed in a rectangular recess portion that opens on the top face of the top wall 4b. This keyboard mount portion supports a keyboard 17. As shown in FIGS. 4 to 6, the keyboard 17 has a keyboard frame 18 and a plurality of keys 19. The keyboard frame 18 is provided as a metal plate sized to engage with the keyboard mount portion 15. The keyboard frame 18 overlaps on a bottom face 15a of the keyboard mount portion 15. The keys 19 are supported on the top surface of the keyboard frame 18.

Figure 2:
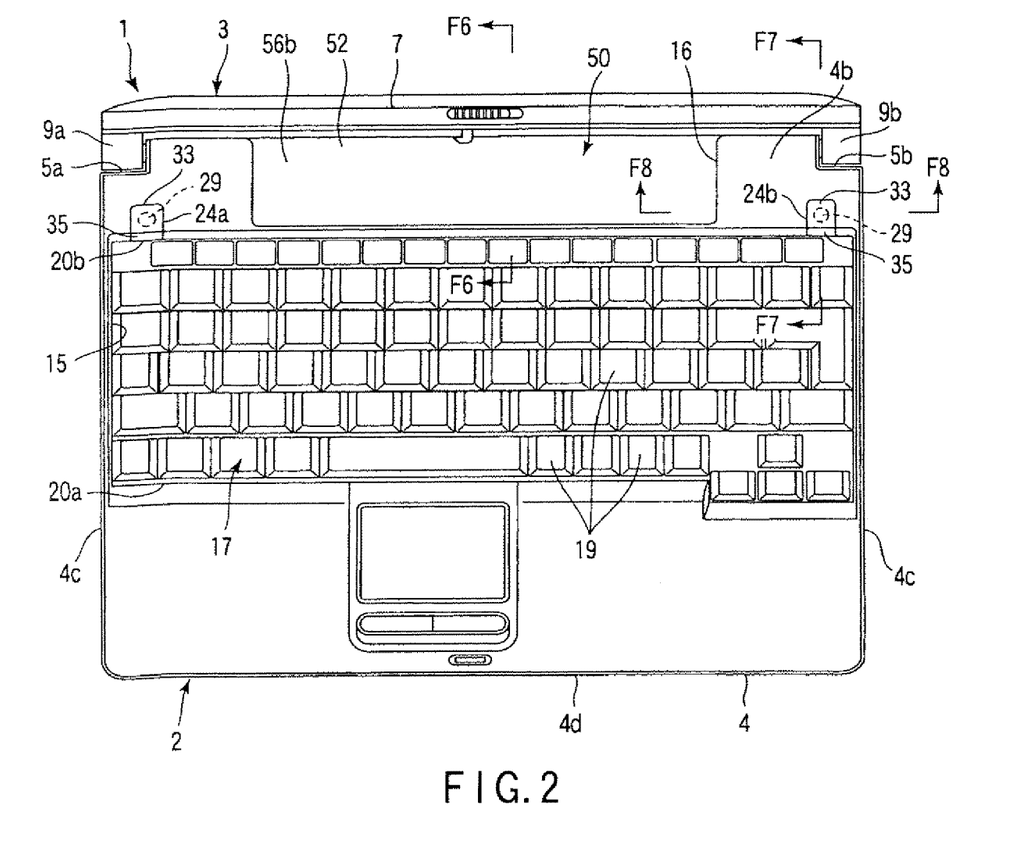
FIG. 2 is an exemplary plan view of the portable computer according to the first embodiment of the invention.

As shown in FIG. 2, the keyboard frame 18 has a front edge portion 20a and a rear edge portion 20b extending in the widthwise direction of the housing 4. The front edge portion 20a of the keyboard frame 18 removably hangs on the front end part of the keyboard mount portion 15. As shown in FIGS. 4 and 5, the keyboard frame 18 has a pair of fasteners (referred to as "fixing pieces" 21a and 21b). The fixing pieces 21a and 21b protrude from the left end part and right end part of the rear edge portion 20b of the keyboard frame 18 toward the rear of the keyboard 17, each of which has a through hole 22.

A pair of receiving portions 24a and 24b is formed on the top wall 4b of the housing 4. The receiving portions 24a and 24b are provided as recesses to receive the fixing pieces 21a and 21b of the keyboard 17. Receiving portions 24a and 24b are located between recess portions 5a and 5b of the housing 4 and the keyboard mount portion 15. The receiving portion 24a and 24b are spaced from each other in the widthwise direction of the housing 4, and open respectively at the left end and right end of the rear end portion of the keyboard mount portion 15. Further, each receiving portions 24a and 24b each has a bottom face 25.

The bottom face 25 is continuous on a bottom face 15a of the keyboard mount portion 15. A boss portion 27 having a screw hole 26 and a pair of engagement holes 28 are formed on the bottom face 25 (see FIG. 8).

In a state in which the keyboard frame 18 is mounted on the keyboard mount portion 15, the fixing pieces 21a and 21b enter the receiving portions 24a and 24b, respectively, and overlap on the top surface of the boss portion 27. A screw 29 is inserted from above into the through hole 22 of each of the fixing pieces 21a and 21b. The screw 29 is mounted into the screw hole 26 of the boss portion 27. By this screw mounting, the fixing pieces 21a and 21b of the keyboard frame 18 are fixed to the housing 4.

As shown in FIG. 6, a boss portion 30 is formed on the bottom face of the keyboard frame 18. The boss portion 30 is positioned between the fixing pieces 21a and 21b, and is exposed to the inside of the housing 4. Another screw 31 is overhung between the boss portion 30 and the bottom wall 4a of the housing 4. The screw 31 is mounted into the boss portion 30 through the bottom wall 4a of the housing 4. By this screw mounting, a relief at the center of the keyboard 17 relevant to the keyboard mount portion 15 is suppressed. From this fact, the keyboard 17 is fixed to the housing 4 at two locations of the rear edge portion 20b of the keyboard frame 18 and at one location of the center.

A cover 33 made of a synthetic resin is engaged into each of the receiving portions 24a and 24b of the housing 4. As shown in FIGS. 7 to 10, the cover 33 comprises: a table top 34 that closes an opening end of each of the receiving portions 24a and 24b; a support wall 35 that extends downwardly from the front end portion of the table top 34; and a pair of engagement claws 36 that protrude downwardly from the table top 34.

When the cover 33 is engaged with each of the receiving portions 24a and 24b, the engagement claws 36 each hang on the engagement holes 28 of the bottom surface 25 of the receiving portions 24a and 24b respectively, and hold the cover 33 on the housing 4. In this manner, the top surface of the table top 34 of the cover 33 is located on a surface which is identical to the top surface of the top wall 4b of the housing 4.

The support wall 35 of the cover 33 is located immediately preceding the keys 19 on the last column of the keyboard 17, and its lower end comes into contact with the top surface of the rear end portion 20b of the keyboard frame 18. Thus, the support wall 35 of the cover 33 sandwiches the rear edge portion 20b of the keyboard frame 18 between the support wall 35 and the bottom surface 15a of the keyboard mount portion 15. Therefore, the cover 33 is compatible with a function of holding the keyboard 17 on the keyboard mount portion 15.

Figure 11:
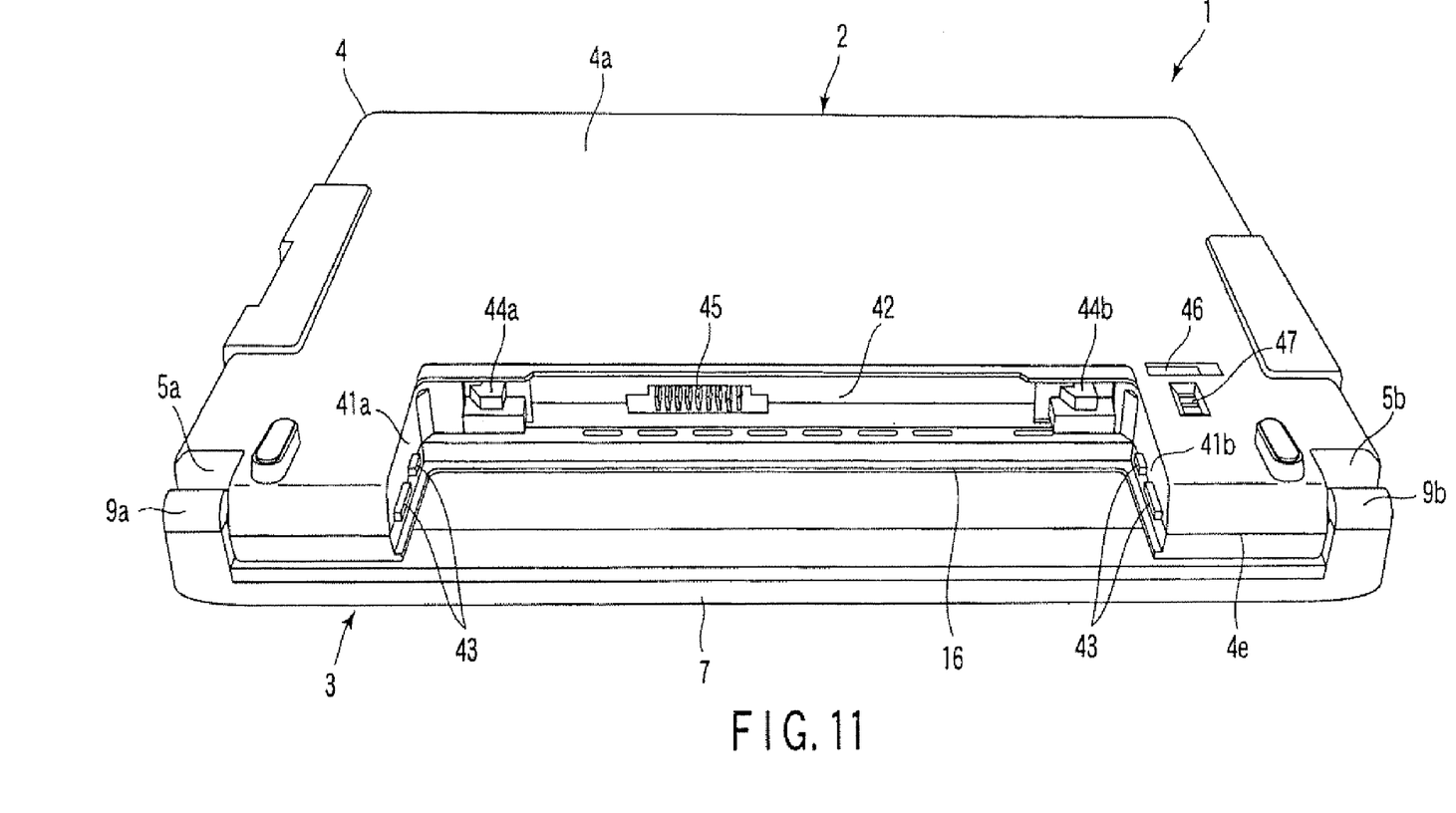
FIG. 11 is an exemplary perspective view of the portable computer showing the shape of the battery receptacle according to the first embodiment of the invention.
Figure 12:
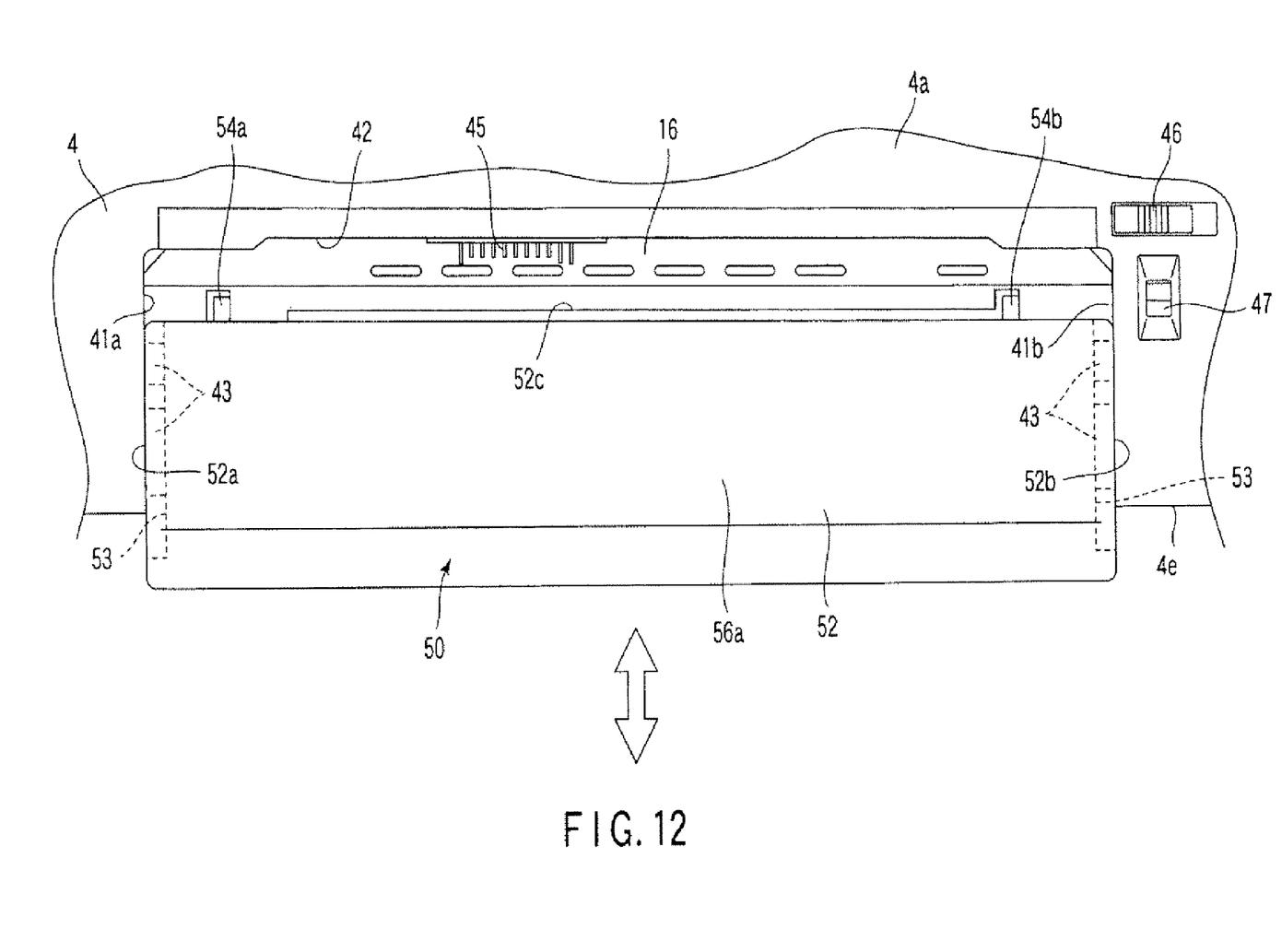
FIG. 12 is an exemplary plan view of the portable computer showing a state in which a battery pack is inserted into the battery receptacle of the housing according to the first embodiment of the invention.

As shown in FIGS. 11 and 12, the battery receptacle 16 is a recessed portion formed by continuous openings in the bottom wall 4a, the top wall 4b, and the rear wall 4e of the housing 4. The battery receptacle 16 has left and right guide walls 41a and 41b and a front end wall 42. The battery receptacle 16 extends in the widthwise direction of the housing 4 at the rear of the keyboard mount portion 15, and is located between the receiving portions 24a and 24b for fixing the fixing pieces 21a and 21b of the keyboard 17.

In other words, the receiving portions 24a and 24 are formed in regions of the top wall 4b of the housing 4 which are spaced at the left side and right side of the battery receptacle 16. Thus, a fixing portion, being a combination of the receiving portions 24a and 24b engaged with their corresponding fixing pieces 21a and 21b, are distributed in the widthwise direction of the housing 4. The battery receptacle 16 is situated between these fixing portions.

Each of the guide walls 41a and 41b of the battery receptacle 16 has a guide rail 43. The guide rail 43 is exposed to the battery receptacle 16, and extends horizontally along the depth direction of the housing 4. As shown in FIG. 6, the front end wall 42 of the battery receptacle 16 is located downwardly of the rear portion of the keyboard mount portion 15 toward an interior of the housing 4, and thus, this front end wall 42 is located below the last column of keys 10. As a result, the keyboard mount portion 15 and the battery receptacle 16 overlap each other in the depth direction of the housing 4.

A pair of latches 44a and 44b and a connector receptacle 45 are allocated on the front end wall 42 of the battery receptacle 16. The latches 44a and 44b are located at the left end part and right end part of the front end wall 42, and are exposed to the battery receptacle 16. The latches 44a and 44b can slide between a locked position and an unlocked position, and are held at the locked position via a spring (not shown). The connector receptacle 45 is exposed to the battery receptacle 16 between the latches 44a and 44b.

An eject lever 46 and a lock lever 47 are allocated at the bottom wall 4a of the housing 4. The eject lever 46 is operated by a fingertip when the latches 44a and 44b are slid from the locked position to the unlocked position. The lock lever 47 is provided to hold the eject lever 46 at the locked position. These levers 46, 47 are adjacent to the battery receptacle 16.

As shown in FIGS. 6 and 12, the battery receptacle 16 removably supports a battery pack 50 which serves as a module. The battery pack 50 is provided as a power source when the portable computer 1 is used in location where a commercially available alternating current power source cannot be obtained. The battery pack 50 comprises: a plurality of batteries 51 which are incorporated in the pack; and a case 52 made of a synthetic resin, the case housing these batteries 51.

The case 52 is formed in an elongated hollow box shaped for engagement with the battery receptacle 16. The case 52 comprises left and right side faces 52a and 52b which face the guide walls 41a and 41b of the battery receptacle 16, respectively; and a top end surface 52c which faces the front end wall 42 of the battery receptacle 16. The case 52 is inserted into the battery receptacle 16 from the rear of the housing 4. By this insertion, the guide rails 43 slidably enters guide grooves 53 formed on the side surfaces 52a and 52b of the case 52. Therefore, the insertion direction of the case 52 is guided, and the case 52 is held at the battery receptacle 16.

Figures 13, 15:
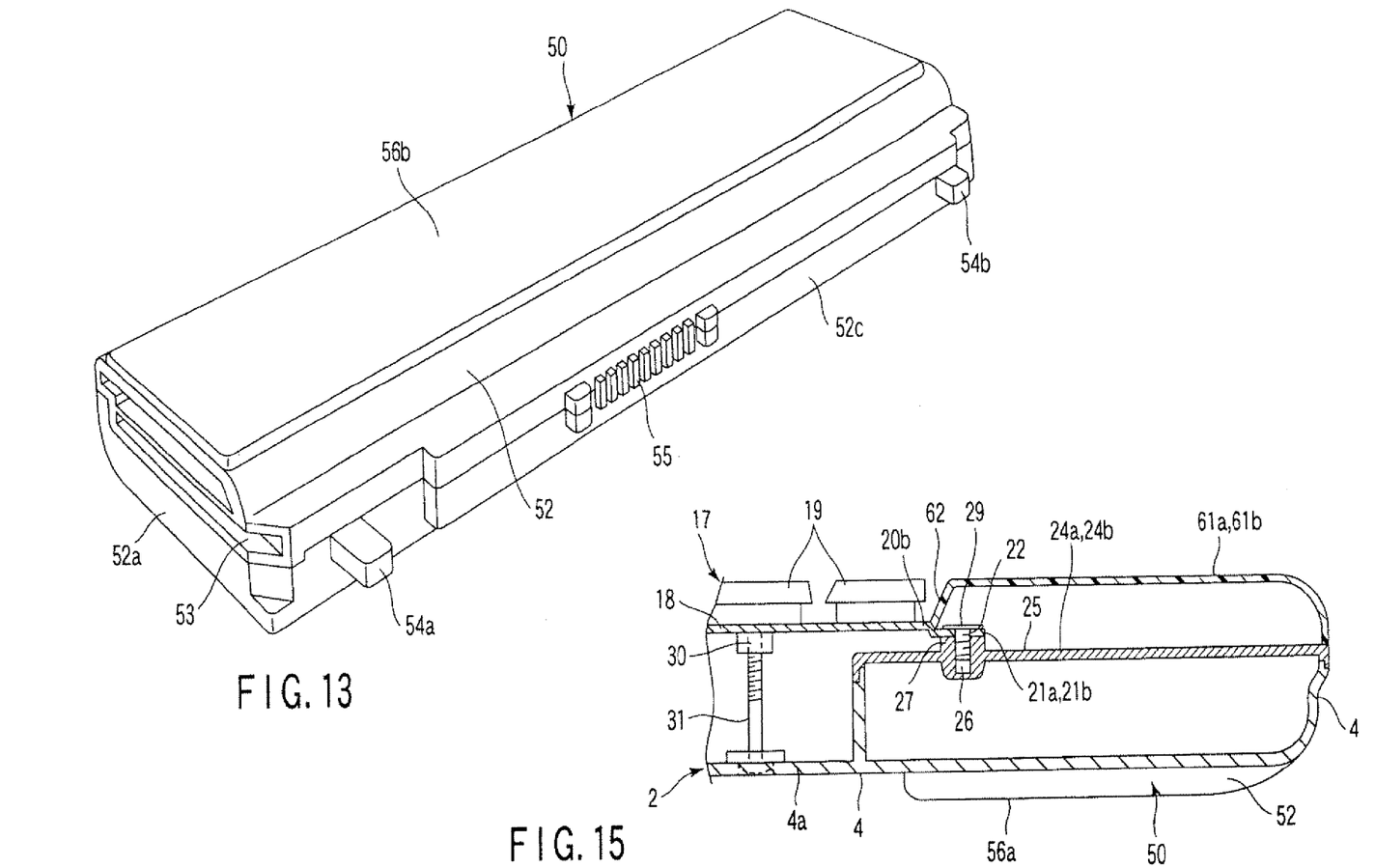
FIG. 13 is an exemplary perspective view of the battery pack for use according to the first embodiment of the invention.
FIG. 15 is an exemplary sectional view of the portable computer showing a state in which a battery pack is mounted on a battery receptacle of a housing according to the second embodiment of the invention.

As shown in FIGS. 11-13, a pair of lock claws 54a and 54b and a battery connector 55 are allocated on a top end surface 52c of the case 52. The lock claws 54a and 54b hang on the latches 44a and 44b when the case 52 is mounted at a predetermined position of the battery receptacle 16. In this manner, the battery pack 50 is locked with the battery receptacle 16. The battery connector 55 is located between the lock claws 54a and 54b, and is electrically connected to the connector receptacle 45 when the lock claws 54a and 54b hang on the latches 44a and 44b.

Further, the case 52 has a bottom face 56a, a top face 56b, and a rear face 56c. Each of these surfaces 56a to 56c is exposed outwardly of the battery receptacle 16 when the battery pack 50 is mounted on the battery receptacle 16. In addition, these faces each configure a part of the exterior of the housing 4.

As shown in FIG. 6 in a state in which the battery pack 50 is mounted on the battery receptacle 16, the front end portion of the battery pack 50 enters below the rear end portion 20b of the keyboard panel 18. Specifically, as shown in FIGS. 6, 11 and 13, the top end surface 52c of the case 52, a connection portion between the connector receptacle 45 and the battery connector 55 and engagement portions between the latches 44a and 44b and the lock claws 54a and 54h are covered below the rear end portion 20b of the keyboard panel 18.

Therefore, the keyboard 17 and the battery pack 50 are supported in the housing 4 in a state in which they have overlapped each other in the depth direction of the housing 4. In addition, the front end of the top surface 56b of the battery pack 50 is located immediately following the keys 19 on the last column of the key board 17.

According to the first embodiment of the present invention as such, the battery receptacle 16 of the housing 4 is located between the receiving portions 24a and 24b affixing the fixing pieces 21a and 21b of the keyboard 17. Thus, the fixing pieces 21a and 21b do not enter between the keyboard mount portion 15 and the battery receptacle 16, and the battery receptacle 16 can be made as close to the keyboard mount portion 15 as possible.

Moreover, the front end of the battery pack 50 is covered beneath the rear edge portion 20b of the keyboard frame 18 so that the battery pack 50 and the keyboard 17 can be overlapped on each other in the depth direction of the housing 4.

As a result, a gap between the battery receptacle 16 and the keyboard mount portion 15 is reduced, and the dimensional depth of the housing 4 can be reduced, making it possible to achieve the compactness of the portable computer 1.

Further, the battery receptacle 16 has a shape that allows the bottom surface 56a, top surface 56b, and rear surface 56c of the case 52 of the battery pack 50 to be exposed and uncovered by the housing 4. Thus, the bottom wall 4a and top wall 4b of the housing 4 do not overlap with the battery pack 50, and the housing 4 can be formed to be thin and compact in comparison with a case in which the battery pack 50 is stored at the inside of the housing 4.

In the above-described first embodiment, although the fixing pieces 21a and 21b of the keyboard frame 18 have been affixed to the receiving portions 24a and 24b of the housing 4 via the screws 29, the present invention is not limited thereto.

For example, with an engagement force generated when the cover 33 is engaged with the receiving portions 24a and 24b, the fixing pieces 21a and 21b may be sandwiched between the support wall 35 of this cover 33 and the bottom surface 25 of the receiving portions 24a and 24b. With this configuration, the screws 29 are eliminated. In addition, with a work of merely mounting and removing the cover 33, the keyboard 17 can be locked with or unlocked from the keyboard mount portion 15.

Further, the battery receptacle is formed in a shape opening on only the rear wall of the housing so that the battery pack may be stored at the inside of the housing.

Figure 14:
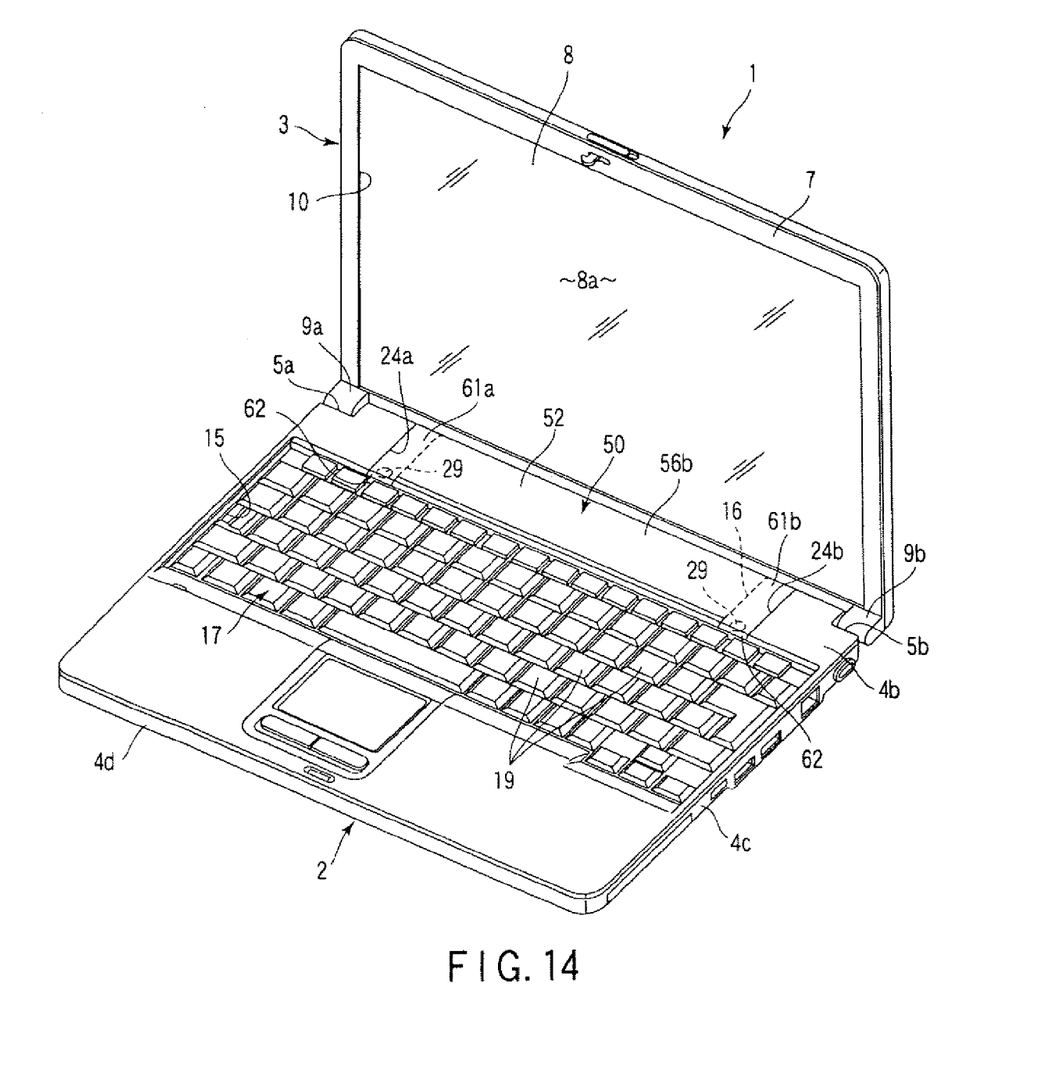
FIG. 14 is an exemplary perspective view of a portable computer according to a second embodiment of the present invention.

The present invention is not specifically limited to the above-described first embodiment. FIGS. 14 and 15 each show a second exemplary embodiment of the present invention.

In the second embodiment, receiving portions 24a and 24b of a housing 4 are formed in location seen at the upper end part of a battery receptacle 16. Each of the receiving portions 24a and 24b is formed in a grooved shape that extends in the depth direction of the housing 4. The front end of the receiving portions 24a and 24b each opens at the rear end part of a keyboard mount portion 15, and the rear end opens at the corner part defined by the top wall 4b and a rear wall 4e. Thus, an allocation gap is situated between the receiving portions 24a and 24b and each of the fixing pieces 21a and 21b is affixed to a boss portion 27 of the receiving portions 24a and 24b.

A case 52 of a battery pack 50 has cover portions 61a and 61b, which laterally overhang the left end part and right end part of a top surface 56 of the case, respectively. The cover portions 61a and 61b cover the receiving portions 24a and 24b and the fixing pieces 21a and 21b from above when the battery pack 50 is mounted at a predetermined position of the battery receptacle 16. In addition, these cover portions are designed to be located on a surface substantially identical to the top wall 4b of the housing 4.

A support wall 62, extending obliquely downward, is formed at the front end of each of the cover portions 61a and 61S. The support wall 62 comes into contact with a rear edge portion 20b of a keyboard frame 18 from above when the battery pack 50 is mounted at a predetermined position in the battery receptacle 16. This support wall 62 sandwiches this rear edge portion 20b between the support wall 62 and the keyboard mount portion 15.

In such a configuration, when the battery pack 50 is inserted into the battery receptacle 16 from the rear of the housing 4, namely between each of the fixing pieces 21a and 21b. The boss portion 27 is covered from above with the cover portions 61a and 61b of the case 52.

From this fact, in a state in which the battery pack 50 is mounted on the battery receptacle 16, the fixing portions namely the fixing pieces 21a and 21b and their corresponding receiving portions 24a and 24b (and optionally boss portion 27) cannot be seen from the outside. These fixing portion are exposed to the top wall 4b of the housing 4 when the battery pack 50 is removed from the battery receptacle 16. Therefore, exclusive covers for covering the fixing portions associated with the fixing pieces 21a and 21b and their respective boss portion 27 are eliminated, and the number of parts can be reduced.

In addition, the fixing pieces 21a and 21b are fixed to the receiving portions 24a and 24b by fastening elements (e.g., screws 29). Thus, even in a state in which the battery pack 50 is removed from the battery receptacle 16, the keyboard 17 is not unlocked.

Further, the receiving portions 24a and 24b for affixing the fixing pieces 21a and 21b of the keyboard 17 are located at the left side and right side of the battery receptacle 16. Thus, the fixing pieces 21a and 21b are not interposed between the keyboard mount portion 15 and the battery receptacle 16. Therefore, a gap between the battery receptacle 16 and the keyboard mount portion 15 can be reduced to the minimum, and the dimensional depth of the housing 4 can be reduced.

Moreover, the receiving portions 24a and 24b formed on the top wall 4b of the housing 4 approach the battery receptacle 16, and an allocation gap between these receiving portion 24a and 24b is reduced. Thus, among the top wall 4b, wide free spaces can be provided at the left side and right side of the receiving portions 24a and 24b, and these free spaces can allocate an icon or a control knob, for example.

Figure 16:
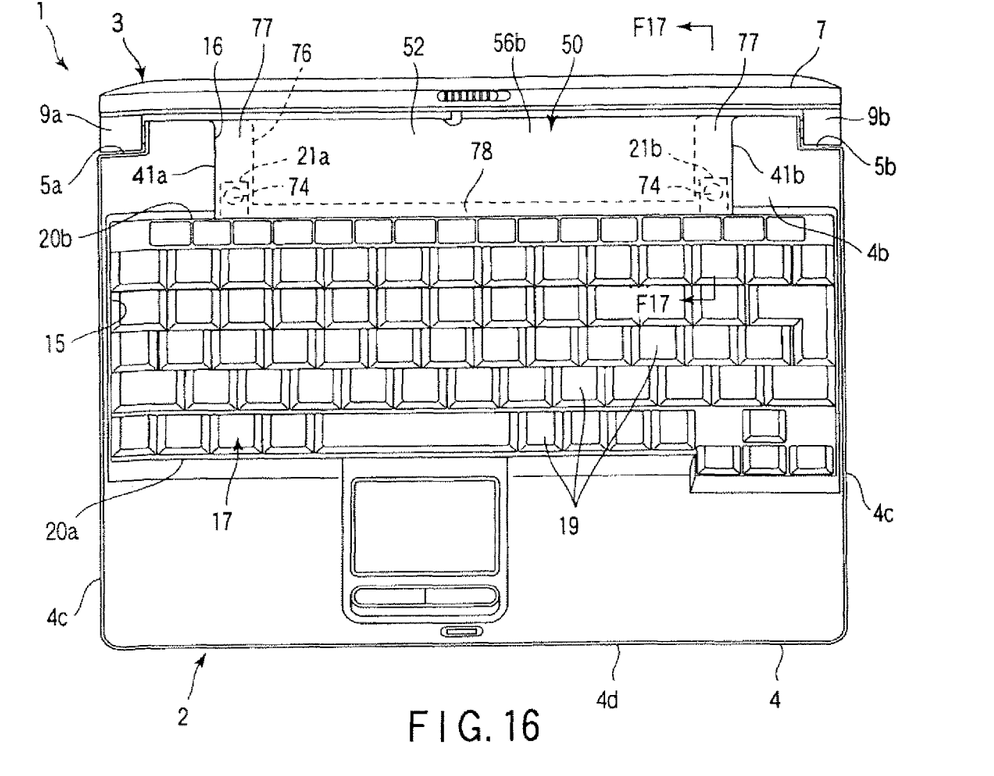
FIG. 16 is an exemplary plan view of a portable computer according to a third embodiment of the present invention.
Figure 17:
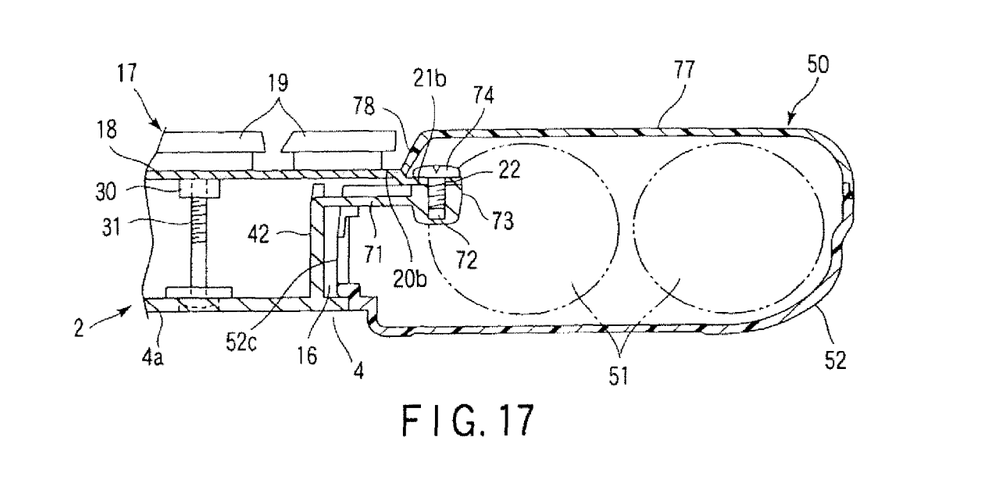
FIG. 17 is a sectional view taken along the line F17-F17 of FIG. 16.

FIGS. 16 and 17 each disclose a third exemplary embodiment of the present invention.

The third embodiment is different from the first embodiment in the positions of the fixing pieces 21a and 21b of the keyboard frame 18 and in the shape of the case 52 of the battery pack 50. The other constituent elements of the portable computer 1 are similar to those according to the first embodiment of the invention. Thus, in the third embodiment of the invention, similar constituent elements in the first embodiment are designated by similar reference numerals. A duplicate description is omitted here.

As shown in FIGS. 16 and 17, a battery receptacle 16 opens the rear end of a keyboard mount portion 15. The fixing pieces 21a and 21b of the keyboard frame 18 are protruded from a rear end portion 20b of the keyboard frame 18 to the battery receptacle 16. These fixing pieces 21a and 21b are adjacent to left and right guide walls 41a and 41b of the battery receptacle 16.

A front end wall 42 of the battery receptacle 16 has a pair of arm portions 71 (only one of them is shown) overhanging at the battery receptacle 16 along the guide walls 41a and 41b. A boss portion 73 having a screw hole 72 is formed at each of the tip end parts of the arm portions 71, and the fixing pieces 21a and 21b are overlapped on the top face of the boss portion 73. A screw 74 is inserted from above into a through hole 22 of the fixing pieces 21a and 21b. The screw 74 is attached to the screw hole 72. By this attachment, the fixing pieces 21a and 21b of the keyboard frame 18 are fixed to the boss portions 73. Thus, two locations at the rear end part of the keyboard 17 are fixed to the housing 4 at the inside of the battery receptacle 16.

The case 52 of the battery pack 50 has: a housing chamber 76 for housing batteries 51; and a pair of hollow cover portions 77. The cover portions 77 are provided to cover the fixing portion between the fixing pieces 21a and 21b and their respective boss portion 73. The cover portions 77 are located at the left end part and right end part of the housing chamber 76, and open on a top end face 52c of the case 52.

As shown in FIG. 17, the case 52 has a support wall 78 which extends obliquely downward at the front end of a top surface 56b thereof. The support wall 78 extends along the widthwise direction of the case 52, and overhangs between the front end parts of the cover portions 77. The support wall 78 upwardly comes into contact with a rear edge portion 20b of the keyboard frame 18 when the battery pack 50 is mounted at a predetermined position of the battery receptacle 16. This support wall 78 sandwiches the rear end portion 20b between the support wall 78 and the keyboard mount portion 15.

With such a configuration, when the battery pack 50 is inserted into the battery receptacle 16 from the rear of the housing 4, the fixing portions associate with each of the fixing pieces 21a and 21b (e.g., fixing piece 21b as shown) and their boss portion 73 are positioned inside of the cover portion 77 of the case 52. Then, the fixing portions are covered with this cover portion 77.

From this fact, in a state in which the battery pack 50 is mounted on the battery receptacle 16, the fixing portion associated with the fixing pieces 21a and 21b and their corresponding receiving portions 24a and 24b (and optionally with the boss portion 73) cannot be seen from the outside. These fixing portions are exposed to this battery receptacle 16 when the battery pack 50 is removed from the battery receptacle 16. Therefore, an executive cover for covering ago the fixing portions may be eliminated, reducing the number of parts used.

Further, the fixing pieces 21a and 21b of the keyboard 17 are fixed to the boss portion 73 of the housing 4 at the inside of the battery receptacle 16. Thus, these fixing pieces 21a and 21b do not enter between the keyboard mount portion 15 and the battery receptacle 16. Therefore, a gap between the battery receptacle 16 and the keyboard mount portion 15 can be reduced to the minimum, and the dimensional depth of the housing 4 can be reduced.

Figure 18:
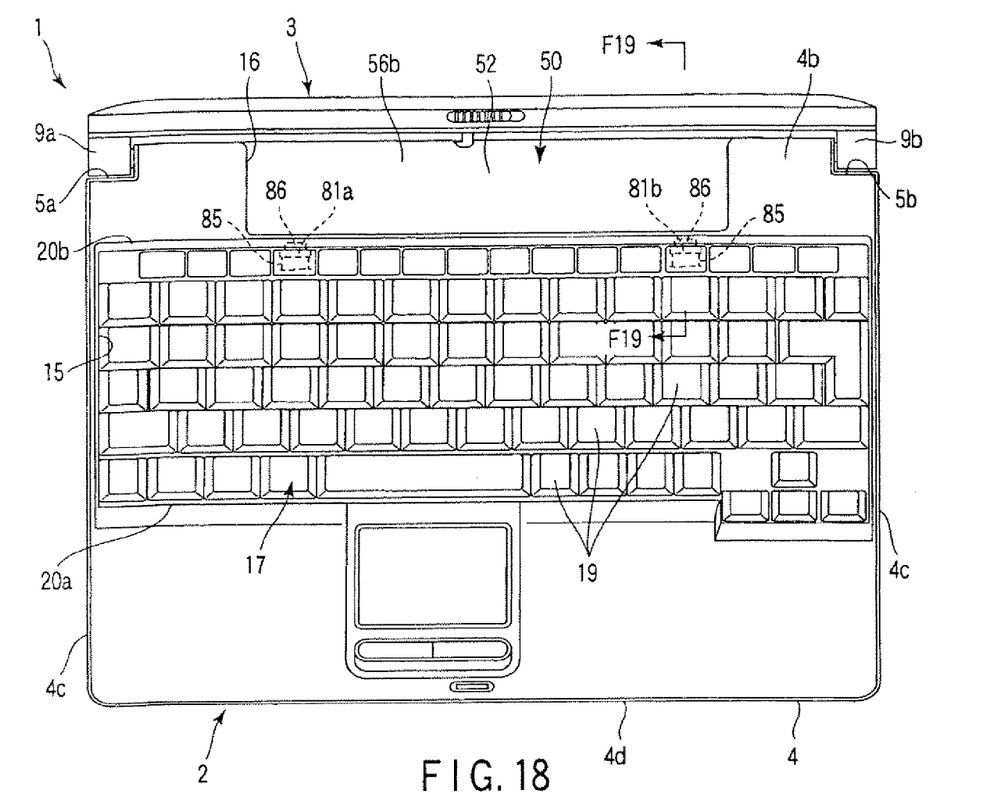
FIG. 18 is an exemplary plan view of a portable computer according to a fourth embodiment of the present invention.
Figure 19:
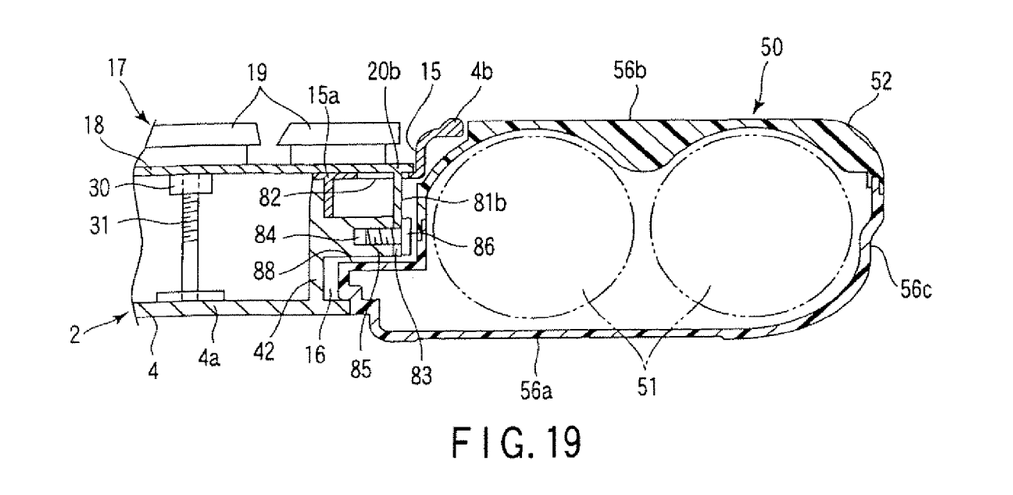
FIG. 19 is a sectional view taken along the line L19-L19 of FIG. 8.

FIGS. 18 and 19 each disclose a fourth exemplary embodiment of the present invention.

The fourth embodiment is different from the first embodiment in configuration for affixing the rear end part of the keyboard 17 to the housing 4. The other constituent elements of the portable computer 1 are similar to those according to the first embodiment of the invention. Thus, in the fourth embodiment of the invention, similar constituent elements in the first embodiment are designated by similar reference numerals. A duplicate description is omitted here.

As shown in FIGS. 18 and 19, a keyboard frame 18 of the keyboard 17 has a pair of fixing pieces 81a and 81b. The fixing pieces 81a and 81b are bent downwardly at a right angle from the left end part and right end part of the rear edge portion 20b of the keyboard frame 18. The fixing pieces 81a and 81b are extruded to the front end of a battery receptacle 16 via through holes 82 opening on a bottom surface 15a of a keyboard mount portion 15. Each of these fixing pieces has a through hole 83 at each of their protrusion end parts.

A front end wall 42 of the battery receptacle 16 has a pair of boss portions 85 each having a screw hole 84. The boss portions 85 are protruded from the left end part and right end part of the front end wall 42 to the battery receptacle 16, and the fixing pieces 81a and 81b are overlapped at the protrusion ends of the boss portions 85.

Screws 86 are inserted from the rear side into the through hole 83 of the fixing pieces 81a and 81b. The screw 86 is mounted into the screw hole 84 of the boss portion 85. By this screw mounting, the fixing pieces 81a and 81b of the keyboard frame 18 are fixed to the boss portions 85. Thus, two locations at the rear end part of the keyboard 17 are fixed to the housing 4 at the inside of the battery receptacle 16.

A case 52 of a battery pack 50 has recess portions 88 (only one of them is shown) at the left end part and right end part of the front end thereof. The recess portions 88 each are formed at the positions corresponding to the boss portions 85 of the battery receptacle 16. Thus, when the battery pack 50 is mounted at a predetermined position of the battery receptacle 16, the head of the screw 86, the fixing pieces 81a and 81b, and the boss portion 85 each are designed to enter the inside of the recess portion 88. Therefore, a fixing portion between the fixing pieces 81a and 81b and the boss portion 85 is covered with the case 52 of the battery pack 50.

With such a configuration, in a state in which the battery pack 50 is mounted on the battery receptacle 16, the fixing portions associated with the fixing pieces 81a and 81b and the boss portion 85 cannot seen from the outside. These fixing portions are exposed to the front end of this battery receptacle 16 when the battery pack 50 is removed from the battery receptacle 16. Therefore, covers for covering the fixing portions are eliminated, and thus, the number of parts can be reduced.

Further, the fixing pieces 81a and 81b of the keyboard 17 are bent downwardly at a right angle from the rear edge part 20b to be located at the inside of the battery receptacle 16. The fixing pieces 81a and 81b are interposed between a front end wall 42 of the battery receptacle 16 and the front end of the battery pack 50. Thus, the fixing pieces 81a and 81b of the keyboard 17 are not interposed between the keyboard mount portion 15 and the battery receptacle 16. Therefore, a gap between the battery receptacle 16 and the keyboard mount portion 15 can be reduced to the minimum, and the dimensional depth of the housing 4 can be reduced.

In addition, the fixing pieces 81a and 81b of the keyboard 17 are positioned at the inside of the battery receptacle 16 so that wide free spaces can be provided at the left side and right side of the battery receptacle 16 among the top wall 4b of the housing 4. Thus, an icon or a control knob can be allocated in a free space.

In the present invention, a module mounted in a housing not specifically limited to a battery pack, and other pack shaped devices may be employed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
  a housing including a keyboard mount portion and a receptacle adapted for receiving a module; and
  a keyboard placed within the keyboard mount portion, the keyboard comprises a plurality of fasteners removably affixed to the housing proximate to the one side of the keyboard mount portion,
  wherein the receptacle is positioned between the plurality of fasteners, opens to a rear of the housing at a rear of the keyboard mount portion, and has a front end located under the keyboard mount portion, the front end of the receptacle overlapping with the keyboard mount portion in a depth direction of the housing.

2. The electronic apparatus of claim 1, wherein the receptacle is a recessed portion formed by continuous openings at a bottom wall, a top wall and a rear wall of the housing.

3. The electronic apparatus of claim 2, wherein the module has a top surface, the top surface being exposed out of the receptacle between the plurality of fasteners of the keyboard when mounting the module on the receptacle.

4. The electronic apparatus of claim 1 wherein a front end portion of the module enters below a rear end portion of the keyboard when mounting the module on the receptacle.

5. The electronic apparatus of claim 1, wherein the plurality of fasteners of the keyboard are spaced from each other in a widthwise direction of the housing more than a width of the receptacle in the widthwise direction of the housing.

6. The electronic apparatus of claim 1, wherein the housing includes a plurality of receiving portions to which the plurality of fasteners of the keyboard are removable affixed, each of the fasteners being affixed to the receiving portions by a fastening element.

7. The electronic apparatus of claim 6, wherein the plurality of receiving portions positioned proximate to one side of the keyboard mount portion.

8. The electronic apparatus of claim 1, wherein the module is a battery pack.

9. The electronic apparatus of claim 1, wherein the module is a power source.

10. An electronic apparatus comprising:
  a housing including a keyboard mount portion and a receptacle, the receptacle being provided for a rear of the keyboard mount portion;
  a module being removably supported by the receptacle; and
  a keyboard placed within the keyboard mount portion, the keyboard comprises a plurality of fasteners removable affixed to the housing proximate one side of the keyboard mount portion,
  wherein the receptacle is positioned between the plurality of fasteners, opens to a rear of the housing at a rear of the keyboard mount portion, and has a front end located under the keyboard mount portion, and a front end portion of the module enters below the keyboard when mounting the module on the receptacle.

11. The electronic apparatus of claim 10, wherein the receptacle is a recessed portion formed by continuous openings at a bottom wall, a top wall and a rear wall of the housing.

12. The electronic apparatus of claim 10, wherein a front end portion of the module is hooked on the receptacle below the keyboard.

13. The electronic apparatus of claim 10, wherein the plurality of fasteners of the keyboard are spaced from each other in a widthwise direction of the housing more than a width of the receptacle in the widthwise direction of the housing.

* * * * *